US005559780A

United States Patent [19]

Maeda et al.

[11] Patent Number: 5,559,780
[45] Date of Patent: Sep. 24, 1996

[54] RECORDING APPARATUS FOR AN OPTICAL RECORDING MEDIUM

[75] Inventors: Yasuaki Maeda, Kanagawa; Hideki Nagashima, Tokyo, both of Japan

[73] Assignee: Sony Corporation, Japan

[21] Appl. No.: 426,144

[22] Filed: Apr. 19, 1995

Related U.S. Application Data

[63] Continuation of Ser. No. 139,555, Oct. 20, 1993, abandoned.

[30] Foreign Application Priority Data

Oct. 23, 1992 [JP] Japan .................................. 4-307838

[51] Int. Cl.$^6$ ..................................................... G11B 7/00
[52] U.S. Cl. ............................................. 369/54; 369/58
[58] Field of Search ............................ 369/58, 54, 48, 369/116, 44.32, 32, 44.27, 44.28, 44.29

[56] References Cited

U.S. PATENT DOCUMENTS

| | | | |
|---|---|---|---|
| 4,611,318 | 9/1986 | Winslow | 369/54 |
| 4,669,072 | 5/1987 | Miura et al. | 369/116 |
| 4,719,612 | 1/1988 | Kengyo | 369/58 |
| 4,774,700 | 4/1988 | Satoh et al. | 369/58 |
| 4,789,974 | 12/1988 | Satoh et al. | 369/44.32 |
| 4,791,622 | 12/1988 | Clay et al. | 369/58 |
| 4,821,254 | 4/1989 | Satoh et al. | 369/58 |
| 4,841,498 | 6/1989 | Sugimura et al. | 369/58 |
| 4,885,735 | 12/1989 | Fukushima et al. | 369/58 |
| 4,894,817 | 1/1990 | Tanaka et al. | 369/54 |
| 4,958,337 | 9/1990 | Yamanaka et al. | 369/59 |
| 4,974,221 | 11/1990 | Hosoyer et al. | 369/44.32 |
| 4,980,878 | 12/1990 | Szerlip | 369/58 |
| 4,984,230 | 1/1991 | Satoh et al. | 369/54 |
| 5,018,124 | 5/1991 | Ogasawara et al. | 369/44.32 |
| 5,142,515 | 8/1992 | McFerrin et al. | 369/54 |
| 5,202,876 | 4/1993 | Takagi et al. | 369/54 |
| 5,210,735 | 5/1993 | Hoshino et al. | 369/44.32 |
| 5,247,505 | 9/1993 | Shikichi et al. | 369/54 |
| 5,255,270 | 10/1993 | Yanai et al. | 369/58 |
| 5,291,467 | 3/1994 | Ishiwata et al. | 369/54 |
| 5,331,616 | 7/1994 | Morita et al. | 369/54 |
| 5,351,227 | 9/1994 | Ichikawa et al. | 369/58 |

FOREIGN PATENT DOCUMENTS

61-17274  1/1986  Japan ........................................ 369/58

Primary Examiner—Nabil Z. Hindi
Attorney, Agent, or Firm—Limbach & Limbach L.L.P.

[57] ABSTRACT

A recording apparatus for an optical recording medium having a pregroove and address data includes a recording head apparatus and a controller. The recording head apparatus has an optical head device and records data on the optical recording medium along the pregroove. The optical head device radiates a light beam having an intensity which is enough to record the data on the optical recording medium. The optical head device includes a detector. The controller controls the recording head apparatus and receives an output signal supplied from the detector. The optical head device is controlled to move a recording start point from the previous recording start point by a predetermined value when the controller detects the occurrence of a recording error according to the output signal from the detector and restart recording the data from the moved recording start point on the optical recording medium.

16 Claims, 5 Drawing Sheets

FIG. 5(a) ADDRESS
FIG. 5(b) LASER POWER
FIG. 5(c) LASER POWER
FIG. 5(d) LASER POWER
FIG. 5(e) LASER POWER
FIG. 5(f) LASER POWER

RECORDING APPARATUS FOR AN OPTICAL RECORDING MEDIUM

This is a continuation of application Ser. No. 08/139,555 filed on Oct. 20, 1993, now abandoned.

BACKGROUND

1. Field of the Invention

The present invention relates generally to recording apparatus for an optical recording medium. More particularly, the present invention relates to a recording apparatus for recording audio data or general data on an optical recording medium.

2. Background of the Invention

Erasable discs on which the user can write or record different musical data or audio data repeatedly are known. One such known erasable disc is a magneto-optical disc. To record data on the magneto-optical disc, a magnetic head is used to apply a vertical magnetic field from one side to a recording location of the disc while heating the same recording location above the Curie temperature by irradiating the magneto-optical disc from the opposite side with a light beam emitted from an optical head, for example, at a higher output level than in the reproducing or playback mode.

There are two systems currently used for recording information signals onto the magneto-optical disc. In one recording system, recording data based on the information signals are supplied to a drive circuit for a light source of the optical head so as to modulate a light beam according to the recording data, and an external magnetic field of the magnetic head is applied with a constant intensity and in one direction. In the other recording system, the recording data are supplied to a drive circuit of the magnetic head for enabling the magnetic head to output an external magnetic field such that the direction of N and S poles of the external magnetic field is reversed according to the recording data, and a light beam is continuously emitted from the optical head at an output level which is required for the recording operation.

Hereinafter will be described a recording apparatus for magneto-optical discs, in which the latter-mentioned recording system is employed.

In the recording apparatus, a signal, such as an audio signal, to be recorded on a magneto-optical disc is subjected to a predetermined modulation process and then supplied as recording data to a magnetic head. The magnetic head generates a vertical magnetic field based on the recording data and applies the vertical magnetic field to the magneto-optical disc. At the same time, an optical head irradiates the magneto-optical disc with a light beam to heat a recording layer of the magneto-optical disc at a temperature above the Curie temperature thereof. Since the magneto-optical disc and the light beam move relatively to one another, the temperature of the recording layer drops below the Curie temperature during which time the recording layer is magnetized in accordance with the direction of the vertical magnetic field applied from the magnetic head. As a result of this magnetization, the audio signal is recorded on the magneto-optical disc.

In the above-described recording operation, a light beam of a reproducing or playback level (i.e., an output level required for the reproducing or playback operation) is emitted from the optical head onto the magneto-optical disc to read address information previously recorded on the magneto-optical disc, and the optical head is moved or transferred to a desired position on the magneto-optical disc. With this accessing operation, the light beam emitted from the optical head is caused to arrive at a desired recording start point or position whereupon the output level of the light beam emitted from the optical head is changed to a recording level which is an output level required for the recording operation. At the same time, the vertical magnetic field based on the recording data is applied from the magnetic head to the magneto-optical disc in the manner described above.

However, when the output level of the light beam is changed to the recording level upon arrival of the optical head and, to be exact, the light beam at the recording start position, if a defect, such as a flaw, is present at the recording start position, the recording operation will be achieved inaccurately. A reason for such inaccurate recording will be given below in greater detail.

In general, the optical disc recording apparatus reads address information from the light beam reflecting from the disc and also extracts a focus servo signal and a tracking servo signal from the reflected light beam during an accessing operation regardless of whether the accessing operation is done for the recording operation or the reproducing or playback operation. For these signals, an automatic gain control (AGC) circuit is provided in order to obtain pieces of extracted information, such as focusing information and tracking information, in terms of signals having a constant amplitude level. One such AGC circuit is shown in FIG. 1.

Figure 1:
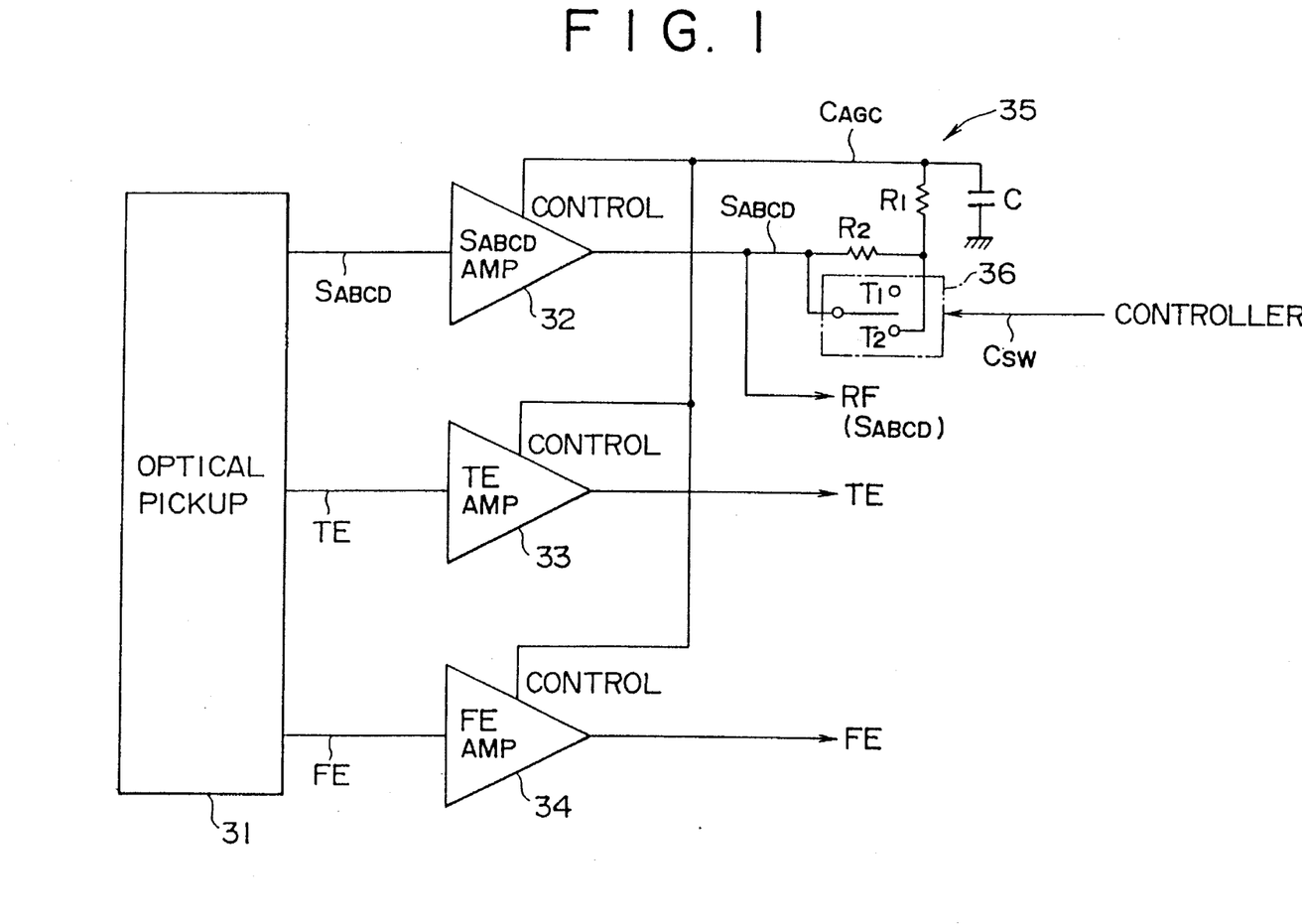
FIG. 1 is a circuit diagram of an automatic gain control (AGC) circuit in an RF amplifier unit of a conventional recording apparatus.

An optical head or an optical pickup 31 shown in FIG. 1 includes a photodetector (not shown) for detecting the light beam reflected by the magneto-optical disc. The output from the photodetector is subjected to an operation process through which an RF signal $S_{ABCD}$, a tracking error signal TE, and a focusing error signal FE are outputted. These signals $S_{ABCD}$, TE and FE are supplied to a sum signal amplifier 32, a tracking error amplifier 33 and a focusing error amplifier, respectively.

The RF signal $S_{ABCD}$ amplified by the sum signal amplifier 32 is supplied to an address decoder unit, a data decoder unit (neither shown), and a time constant circuit 35 composed of first and second resistors $R_1$, $R_2$ and a capacitor C. The output signal of the time constant circuit 35 is fed back, as an AGC control signal $C_{AGC}$, to the sum signal amplifier 32, the tracking error amplifier 33 and the focusing error amplifier 34 for controlling the gain of the respective amplifiers 32, 33, 34. As the level of the AGC control signal $C_{AGC}$ increases, the gain of each of the amplifiers 32, 33, 34 decreases. Conversely, the gain of each amplifier 32, 33, 34 increases with a decrease in the level of the AGC control signal $C_{AGC}$. By virtue of the feedback control, the output from each of the amplifiers 32, 33, 34 is controlled at a constant level. Thus, amplitude levels of the focusing error signal FE and the tracking error signal TE are controlled constantly.

The time constant circuit 35 includes a switch 36 which is constructed to select a first terminal $T_1$ or a second terminal $T_2$ depending on a switching control signal $C_{SW}$ supplied from a controller (not shown) such as a microcomputer. When the terminal $T_1$ is selected, the time constant of the time constant circuit 5 is set to a relatively large value due to the combination of the resistors $R_1$, $R_2$ and the capacitor C. In contrast, when the terminal $T_2$ is selected, the time constant of the time constant circuit 5 is set to a relatively small value due to the combination of the resistor $R_1$ and the capacitor C.

A consideration will be given to a moment at which the output level of the light beam is increased to the recording level upon arrival of the light beam from the optical head at the recording start position. In this instance, since the quantity of the reflected light beam increases with an increase in the output level of the light beam, the amplitude of the tracking error signal TE and the amplitude of the focusing error signal FE are increased. To accomplish a normal servo operation, the amplitude of the error signals TE, FE must return to the initial level as quickly as possible. To this end, when the output level of the light beam is to be increased, the terminal $T_2$ of the switch 36 is selected to reduce the time constant of the AGC control signal $C_{AGC}$, thereby achieving the AGC control rapidly.

In contrast, during continued recording operation continues or in the reproducing or playback mode, the terminal $T_1$ of the switch 36 is selected to increase the time constant of the AGC control signal $C_{AGC}$ in order to insure a continued recording or reproducing operation without undue fluctuation of the signal level even in the presence of a slight damage on the magneto-optical disc.

Figure 2A:
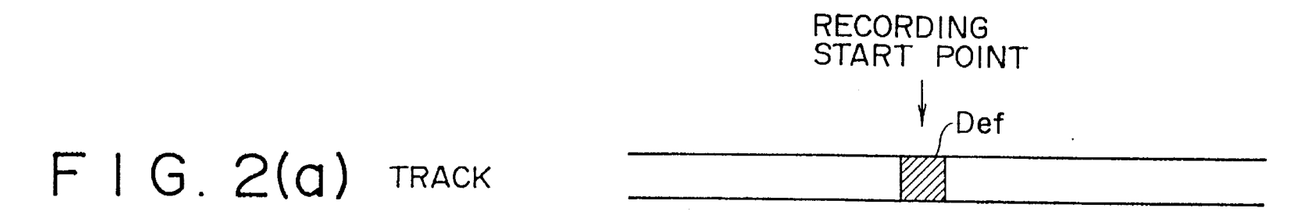
FIG. 2(a) shows a structure of a recording track having a defect.
Figure 2B:
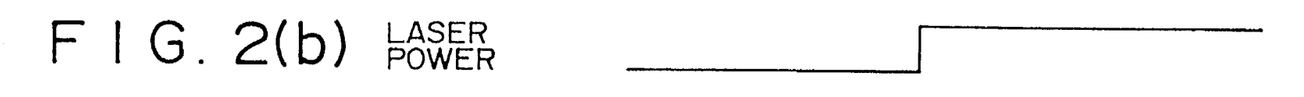
FIG. 2(b) shows a control operation of a laser power level.
Figure 2C:
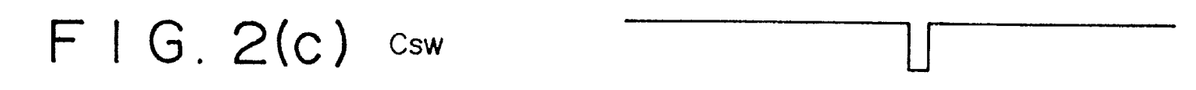
FIG. 2(c) shows a switching control signal $C_{AGC}$.
Figure 2D:
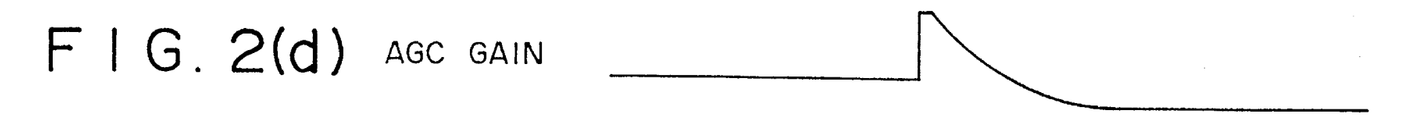
FIG. 2(d) is a graph of the gain of the AGC controlled amplifiers.

Now, we assume that a recording track shown in FIG. 2(a) has a defect Def, such as a flaw, existing at a recording start point or position where the laser power is changed to a high level, as shown in FIG. 2(b). In this instance, due to the influence of the defect Def, the detected quantity of the light beam reflecting from the magneto-optical disc is reduced. However, when the laser power is increased, the time constant of the AGC control signal $C_{AGC}$ is set to have a small value under the control of the switching control signal $C_{SW}$ shown in FIG. 2(c). Accordingly, the AGC control signal $C_{AGC}$ instantaneously follows up an increase in the laser power, thereby increasing the gain of the amplifiers 32, 33, 34 abruptly. Since the time constant is returned by the switching control signal $C_{SW}$ to the ordinary level immediately after the completion of shifting-up of the laser power, it takes time until the gains of the amplifiers 32, 33, 34 drops to a proper level. The gain of the thus AGC controlled amplifiers 32, 33, 34 is as shown in FIG. 2(d).

Figure 2E:
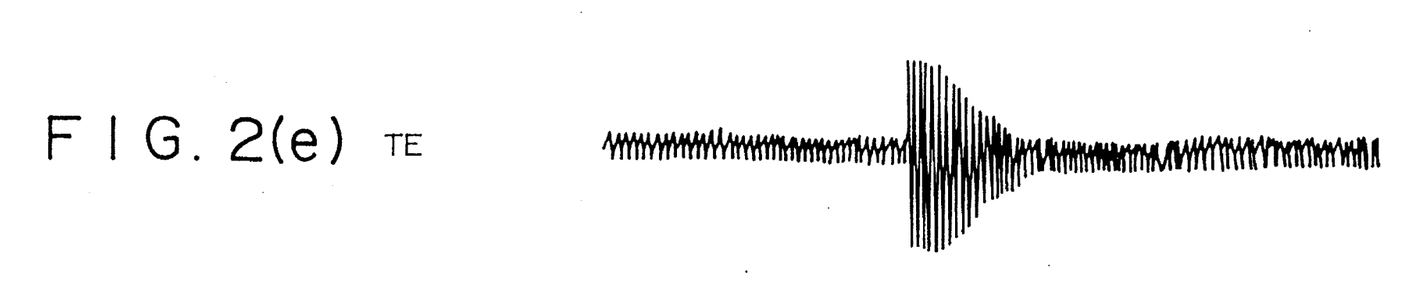
FIG. 2(e) shows the level of a tracking error signal TE.

Accordingly, the amplitude level of the tracking error signal TE, for example, becomes unstable, as shown in FIG. 2(e), so that the servo operation is performed unstably. The same may be said of the focusing error signal FE. Under these circumstances, an operation failure such as a defocusing or a track jump is likely to occur, disabling the recording apparatus from continuing the normal recording operation.

SUMMARY OF THE INVENTION

It is, therefore, an object of the present invention to provide a recording apparatus for an optical recording medium which is able to solve the above-mentioned problems.

According to the present invention, there is provided a recording apparatus for an optical recording medium having a pregroove and address data. The recording apparatus includes a recording head apparatus and a controller. The recording head apparatus has an optical head device and records data on the optical recording medium along the pregroove. The optical head device radiates a light beam having an intensity which is enough to record the data on the optical recording medium. The optical head device includes a photodetector. The controller controls the recording head apparatus and receives an output signal supplied from the photodetector. The optical head device is controlled to move a recording start point from the previous recording start point by a predetermined value when the controller detects the occurrence of a recording error according to the output signal from the photodetector and restart recording of the data from the moved recording start point on the optical recording medium.

With the recording apparatus thus constructed, an appropriate recording operation can be performed even when a defect such as a flaw is present at the recording start point on the optical recording medium. This is because when the recording error appearing at the beginning of a recording operation is judged as caused by the defect, the recording start point is shifted by a predetermined value, or the recording is restarted from a position which is to lapse a predetermined period from the recording start address.

The above and other objects, features and advantages of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

The invention will be more readily understood with reference to accompanying drawing, wherein:

FIGS. 2(a) through 2(e) are a set of a diagrammatical view explanatory of an error occurring in the conventional recording apparatus due to a disc fault.

FIG. 5(a) through 5(f) are set of a diagrammatical view explanatory of the operation achieved in the recording mode of the recording and reproducing apparatus.

DETAILED DESCRIPTION OF THE INVENTION

A recording and reproducing apparatus for use with an optical recording medium according to one embodiment of the present invention will be described below in detail with reference to FIGS. 3 to 5. The optical recording medium used in the illustrated embodiment is a magneto-optical disc.

Figure 3:
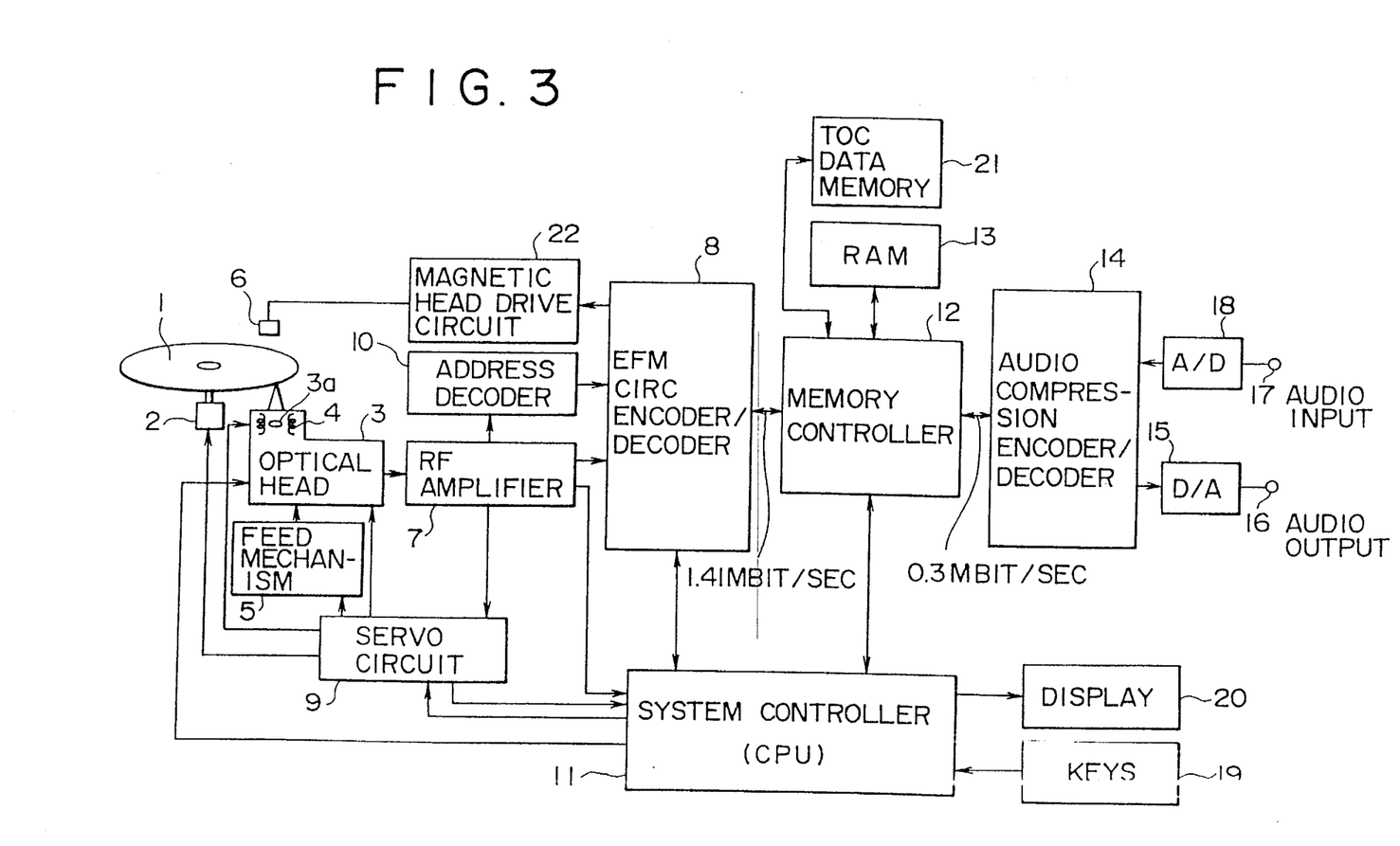
FIG. 3 is a block diagram showing a recording and reproducing apparatus according to an embodiment of the present invention.
Figure 4:
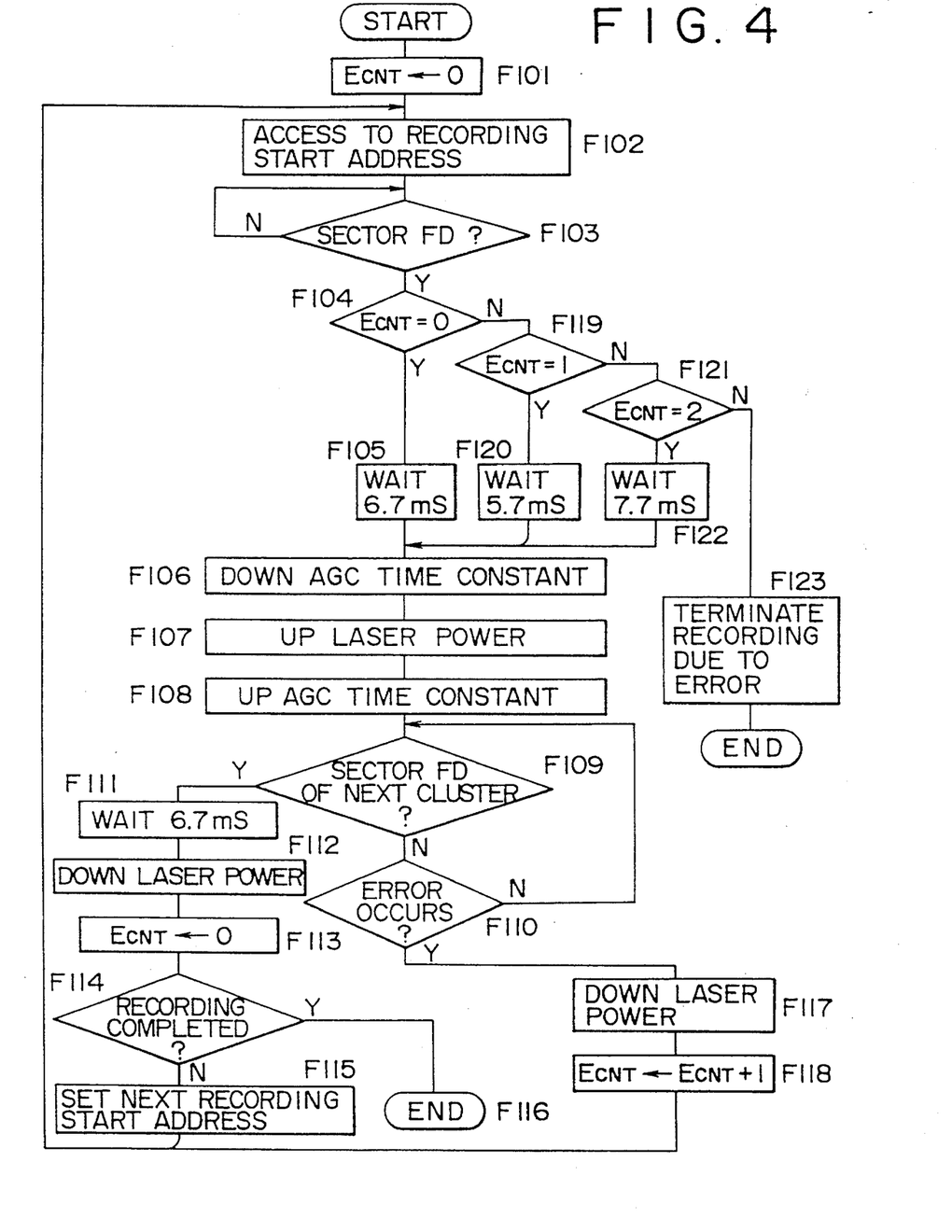
FIG. 4 is a flowchart showing a sequence of operation achieved in the recording mode of the recording and reproducing apparatus.

FIG. 3 shows a block diagram of a main portion of the recording and reproducing apparatus.

In FIG. 3, reference numeral 1 designates a magneto-optical disc on which a plurality of pieces of data, such as audio signals, musical information and general information, are already recorded or are to be recorded. The magneto-optical disc 1 includes a substrate made of a transparent material, a recording layer formed on the substrate, and a protective layer covering the recording layer. The magneto-optical disc 1 has a pregroove which is a groove previously formed in order to guide a light beam emitted from an optical head described later. The pregroove wobbles in the radial direction of the magneto-optical disc 1 according to address data.

Reference numeral 2 denotes a spindle motor provided for rotationally driving the magneto-optical disc 1 at a constant linear velocity (CLV) or a constant angular velocity (CAV). The spindle motor 2 has a rotating shaft whose front end is connected to a turntable (not shown) on which the magneto-optical disc 1 is placed.

The optical head, designated by numeral 3 in FIG. 3, is disposed in a position confronting the substrate of the magneto-optical disc 1. In the recording mode of operation, the optical head 3 irradiates the magneto-optical disc 1 with a light beam having an output power level or intensity which is enough to perform the recording operation. Similarly, in the reproducing mode of operation, the optical head 3 irradiates the magneto-optical disc 1 with a light beam whose output level is lower than as required in the recording mode. In either operation mode, the light beam irradiated from the optical head 3 is focused on the recording layer of the magneto-optical disc 1. The optical head 3 includes an optical system, a light source, such as a laser diode, a polarized beam splitter, and an objective lens 3a, and further has a photodetector having a plurality of light-receiving portions. The optical head 1 is provided with an actuator 4, such as an electromagnetic actuator. The actuator 4 drives the objective lens 3a in a focusing direction and a tracking direction, respectively, according to a focusing error signal and a tracking error signal both of which will be described later. The optical head 3 is moved in the radial direction of the magneto-optical disc 1 by a feed mechanism 5.

Reference numeral 6 denotes a magnetic head which is disposed in confrontation to the protective layer of the magneto-optical disc 1 and located close to the magneto-optical disc 1 for generating, as an external magnetic field generator, a vertical magnetic field according to the recording data. The magnetic head 6 includes an electromagnet which is constituted of a magnetic substance and a coil wound around the magnetic substance. The magnetic head 6 is attached to the distal end of an arm member (not shown) and disposed in confronted relation to the objective lens 3a of the optical head 3, with the magneto-optical disc 1 interposed between the magnetic head 6 and the objective lens 3a. The proximal end of the arm member is connected to the optical head 3 so that when the optical head 3 is displaced in the radial direction of the magneto-optical disc 1 by the feed mechanism 5, the magnetic head 6 is also displaced in the radial direction of the magneto-optical disc 1 together with the optical head 3.

The respective light receiving portions of the photodetector in the optical head 3 supply output signals to an RF amplifier 7. In the RF amplifier 7, the output signals received from the respective light-receiving portions of the photodetector are used to carry out an arithmetic operation process. Through the operation process, the RF amplifier 7 generates an RF signal, a focusing error signal, a tracking error signal, a focus monitor signal, etc. Among these signals, a low frequency component of the tracking error signal is supplied via a servo circuit, described later, to the feed mechanism 5 so as to move the optical head 3 in the radial direction of the magneto-optical disc 1 in synchronism with the progress of the recording/reproducing operation.

A first encoder/decoder, designated by numeral 8 shown in FIG. 3, receives the RF signal supplied from the RF amplifier 7, address data supplied from an address decoder (described later), and recording data supplied from a memory controller (described later). The first encoder/decoder 8 conducts an EFM (Eight to Fourteen Modulation) process and a decoding process such as a CIRC (Cross Interleave Reed-Solomon Code) decoding process that are taken in conjunction with the RF signal received from the RF amplifier 7. For the digital data supplied via the below-mentioned memory controller, the EFM process and a CIRC encoding process are conducted by the first encoder/decoder 8.

Reference numeral 9 denotes a servo circuit to which are supplied error signals including the focusing error signal, the tracking error signal outputted from the RF amplifier 7. The servo circuit 9 generates a focus servo signal, a tracking servo signal, and a spindle servo signal according to the error signals supplied thereto. The focus servo signal and the tracking servo signal are supplied to the actuator 4 to move the objective lens 3a in the focusing direction and the tracking direction. The spindle servo signal is supplied to the spindle motor 2 to take up or cancel rotational deviations of the spindle motor 2. Thereby, the magneto-optical disc 1 is rotated at the CLV or the CAV.

The address decoder, designated by numeral 10 in FIG. 3, receives a signal such as a push-pull signal which is supplied from the RF amplifier 7 when the wobbling pregroove of the magneto-optical disc 1 is detected. The address decoder 10 demodulates the address data according to the push-pull signal as a pregroove detection signal supplied from the RF amplifier 7. The demodulated address data is supplied to the first encoder/decoder 8 and also to the system controller (described later) via the first encoder/decoder 8. The address decoder 10 also receives the RF signal from the RF amplifier 7. From the RF signal, the address decoder 10 extracts address information recorded as data and supplies the extracted address information to the system controller via the first encoder/decoder 8.

The system controller, denoted by numeral 11 in FIG. 3, comprises a microcomputer, for example. The system controller 11 receives the address information or data supplied from the address decoder 10 and the focus monitor signal supplied from the RF amplifier 7. The system controller 11 is connected with an operator console or input unit 19 and a display unit 20. The operator input unit 19 includes a plurality of keys, such as a record key, a reproducing or playback key, a stop key, a search key, all of which are operated by the user. When any one of the keys is operated, a corresponding input signal is supplied to the system controller 11. The display unit 20 uses a liquid crystal display, for example, and gives a visual representation of data, such as elapsed time or the like time information, title, music number, etc., according to display control signals supplied from the system controller 11. Based on the signal supplied from the operator input unit 19, and those signals supplied from the components previously described, the system controller 11 controls the operation of the optical head 3, the RF amplifier 7, the first encoder/decoder 8, the servo circuit 9 and the memory controller (described later). To the system controller 11 are supplied a lock detection signal of a PLL (phase-locked loop) circuit which generates a bit clock for a recording or a playback operation, and a monitor signal observing the absence of a frame synchronizing signal of the reproducing data (left and right channels). The system controller 11 includes a detecting means or unit which detects a recording error depending on an extraordinary focus monitor signal, a discontinuity in a series of address information, or an incapability in extracting the address information.

The memory controller, designated by numeral 12 shown in FIG. 3, controls write and read operations of a memory 13. The memory controller 12 is supplied with reproducing data outputted from the first encoder/decoder 8 at a transfer rate 1.41 Mbit/sec. The memory controller 12 first writes the reproducing data to the memory 13. The thus stored reproducing data is read out from the memory 13 at a transfer rate of 0.3 Mbit/sec and then supplied to a second encoder/decoder (described later) by means of the memory controller 12. The memory 13 is used as a random access memory (RAM) of a 1 Mbytes capacity. The second encoder/decoder 14 is provided for achieving an audio speech compression/expansion process. The reproducing data is supplied from the memory 13 to the second encoder/decoder 14 at the transfer rate of 0.3 Mbit/sec. In the second encoder/decoder 14, time-axis components of digital data supplied from an analog-to-digital (A/D) converter (described later) are separated into predetermined frequency components through a MDCT (Modified Discrete Cosine Transform) process and subsequently compressed using an audio masking effect. The second encoder/decoder 14 also expands the compressed data such as the reproducing data read from the memory 13.

The digital data expanded by the second encoder/decoder 14 is supplied to a digital-to-analog (D/A) converter 15 where the digital data is converted into an analog signal. The thus converted analog audio signal is outputted from an output terminal 16 to an external amplification circuit, for example, as audio signals of left and right channels. An analog audio signal inputted from an input terminal 17 is supplied to the A/D converter 18 where the analog signal is converted into a digital audio signal of 16 bits, for example. The digital audio signal is then supplied to the second encoder/decoder 14.

A drive circuit 22, associated with the magnetic head 6, is supplied with encoded recording data from the first encoder/decoder 8. The drive circuit 22 drives the magnetic head 6 according to the encoded recording data.

Numeral 21 designates a memory for storing therein table of contents (TOC) information which is read from the magneto-optical disc 1. The memory 21 (hereinafter referred to as "TOC memory") uses a RAM, for example. The TOC information is read from the magneto-optical disc 1 in a manner described below. When the magneto-optical disc 1 is completely loaded on the recording and reproducing apparatus, or before the recording operation or the reproducing or playback operation is started, the system controller 11 issues a control signal to start rotation of the spindle motor 2 and move the optical head 3 to a position adjacent to the inner peripheral edge of the magneto-optical disc 1. Then, the focus servo system and the tracking servo system of the optical head 3 as well as the servo system of the spindle motor 2 are set up or activated. Subsequently, the TOC information is read by the optical head 3 from the magneto-optical disc 1. The TOC information is then supplied to the RF amplifier 7, the first encoder/decoder 8, and the memory controller 12 and finally stored in the TOC memory 21. Thereafter, the TOC information stored in the TOC memory 21 is used by the system controller 11 for controlling the recording and playback operations effected on the magneto-optical disc 1. Particularly in the case of the erasable magneto-optical disc 1, management data for discriminating a recordable area and a recorded area, viz., user TOC information can be recorded. The content of the user TOC information is renewed or updated each time a recording operation or an erasing operation is performed. As a result, the recording and playback operations are achieved according to the updated user TOC information.

The RF amplifier 7 is provided with an AGC circuit such as shown in FIG. 1, so that the amplitude of the RF signal, focusing error signal and tracking error signal that are supplied from the RF amplifier 7 is controlled at a constant level. The AGC circuit executes a time constant controlling operation under the control of the system controller 11 such that the time constant is reduced only when the laser power is increased when the recording operation is started.

In the illustrated embodiment, the optical head 3 reads out the data from the magneto-optical disc 1 at a read rate 1.41 Mbit/sec and transfers the reproducing data therefrom to the memory 13 at a transfer rate 1.41 Mbit/sec.

When the recording operation is conducted on the magneto-optical disc 1, a recording signal, such as an analog audio signal, supplied to the audio input terminal 17 is converted into a digital audio signal by the A/D converter 18. The digital audio signal is then supplied to the second encoder/decoder 14 where the digital audio signal is subjected to an audio speech compression encoding process. Digital data which has been compressed by the second encoder/decoder 14 is temporarily written by the memory controller 12 to the memory 13 at a transfer rate 0.3 Mbit/sec. The digital data thus stored in the memory 13 is read by the memory controller 12 and subsequently supplied to the first encoder/decoder 8 at the transfer rate 1.41 Mbit/sec. In the first encoder/decoder 8, the digital data is encoded through the CIRC encoding process or the EFM process. The recording data outputted from the first encoder/decoder 8 is supplied to the magnetic head drive circuit 22.

The magnetic head drive circuit 22 supplies a drive signal to the magnetic head 6 according to the encoded recording data. Thus, a vertical magnetic field is applied to the magneto-optical disc 1 by means of the magnetic head 6. In this instance, the system controller 11 supplies a control signal to the optical head 3 for causing the optical head 3 to emit a light beam with a recording level.

To read data from the magneto-optical disc 1, the magneto-optical disc 1 is completely loaded on the recording and reproducing apparatus whereupon the TOC information, namely the user TOC information in this case, is readout from the magneto-optical disc 1 and then stored in the TOC memory 21. Based on the TOC information stored in the TOC memory 21, items of information such as total play time, total number of recorded musical compositions, and title of the musical composition are displayed on the display unit 20. Then, a key on the operator input unit 19 is operated by the user to input to the system controller 11 a signal representing the selection of music or the playback start, whereupon the system controller 11 sends a control signal to the optical head 3, causing the optical head 3 to irradiate the magneto-optical disc 1 with a light beam having an output power level or intensity which is enough to perform the reproducing or playback operation. The light beam is reflected by the magneto-optical disc 1 and then detected by the photodetector incorporated in the optical head 3. Upon detection, the photodetector supplies an output signal to the RF amplifier 7. Error signals outputted from the RF amplifier 7 are supplied to the servo circuit 9 to accomplish various servo control operations. The RF signal from the RF amplifier 7 is temporarily stored in the memory 13 via the first encoder/decoder 8 and the memory controller 12. The reproducing data temporarily stored in the memory 13 is then supplied via the memory controller 12 to the second encoder/decoder 14 where an expanding process is effected on the reproducing data. The expanded reproducing data is supplied to the D/A convertor 15 where the digital audio data as the reproducing data is converted to an analog audio signal which is subsequently outputted from the output terminal 16.

A recording operation of the recording and reproducing apparatus of the foregoing construction will be described below with reference to FIGS. 4 and 5.

The magneto-optical disc 1 has tracks whose recording unit is set to one cluster. The length of one cluster is equal to the length of two to three tracks. As described above, since the transfer rate 0.3 Mbit/sec taken when the input audio signal is written to the memory 13 is different from the transfer rate 1.41 Mbit/sec taken when the digital data read from the memory 13 is supplied to the magnetic head 6, the recording operation effected on the magneto-optical disc 1 takes place intermittently on a cluster by cluster basis.

As shown in FIG. 5(*a*), each cluster is composed of 36 sectors which starts from FC and is ended with 1F. Address information is given to each sector by the pregroove. In the recording operation, address information is written, as data, to each sector.

Now we assume that the data recording is effected on a cluster by cluster basis as shown in FIG. 5(*a*). In this case, the recording is executed from the second sector FD of the cluster, and the output power level or the intensity of a light beam emitted from the optical head 3 is kept at the recording level during a period corresponding to the distance between the sector FD and a sector FD of the next cluster, as shown in FIG. 5(*b*).

Hereinafter will be described in greater detail a control operation conducted when the laser power is shifted up at the beginning of the recording operation. When the optical head 3 or the light beam emitted from the optical head 3 arrives at the sector FD, the arrival of the optical head 3 or the light beam at the sector FD is detected by the system controller 11 depending on the address information obtained from the pregroove. Upon detection, the system controller 11 controls the power level of the light beam such that when a 6.7 msec period running from the arrival of the optical head 3 or the light beam at the sector FD elapses, the laser power, i.e., the intensity of the light beam is shifted up to the recording level. Under normal conditions, the laser power is kept at the recording level until after a 6.7 msec period following the arrival of the optical head 3 or the light beam at a sector FD of the next cluster elapses. During that time, the recording operation is performed. Since each sector requires a 13.3 msec period for scanning, a point of time or instant at which the 6.7 msec period following the arrival of the optical head or the light beam at the sector FD elapses is located at the center of the sector FD.

However, if a defect Def is present at the center of the sector FD, as shown in FIG. 5(*c*), a problem arises in that when the output power level of the light beam is shifted up, as shown in FIG. 5(*d*), the AGC gain increases abruptly because the time constant of the AGC control signal in the RF amplifier 7 is set to a small value. As a result, the amplitude of the servo signal varies or fluctuates widely so that the servo control operation is performed unstably, eventually causing a recording error such as a track jump or a defocusing.

In that case, an abnormality in terms of an extraordinary focus monitor signal, a discontinuity in the series of extracted addresses caused by the track jump, or an impossibility in extracting the address is detected by the detecting unit of the system controller 11. Upon detection, the system controller 11 judges the detected phenomenon to have been caused by the presence of the defect Def and, based on this judgment, a countermeasure or recovery action is taken by the system controller 11, as described below. However, if the recording operation continues successfully without involving any recording error even when a defect Def is actually-present, this means that the discontinuity in the extracted addresses does not occur. In this case, no recovery action is taken by the system controller 11.

Figure 5A:
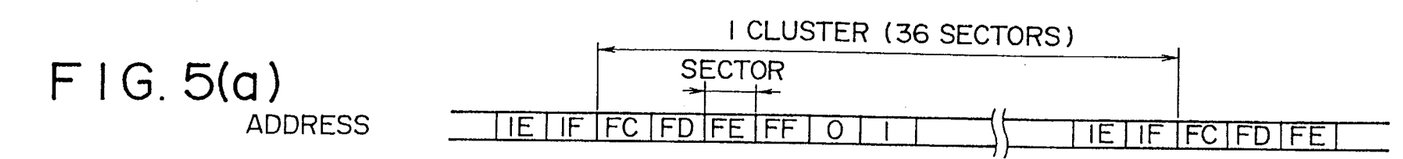
FIG. 5(a) shows a structure of the cluster.
Figure 5B:
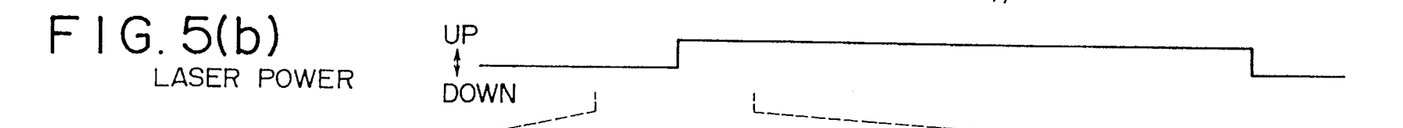
FIG. 5(b) is a graph of a laser power.
Figure 5C:
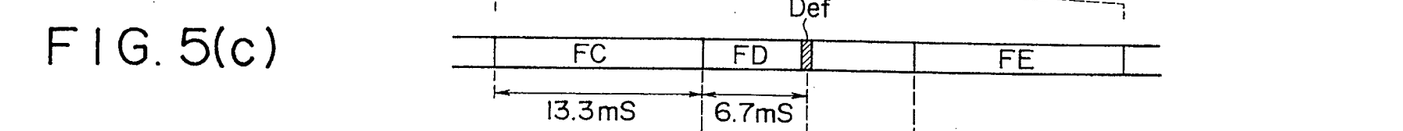
FIG. 5(c) shows a cluster having a defect.
Figure 5D:
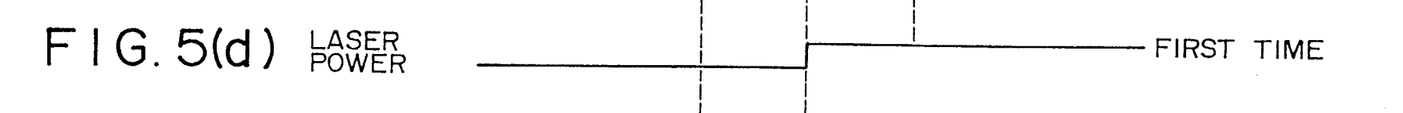
FIGS. 5(d), 5(e) and 5(f) show control operations of the laser power level.
Figure 5E:
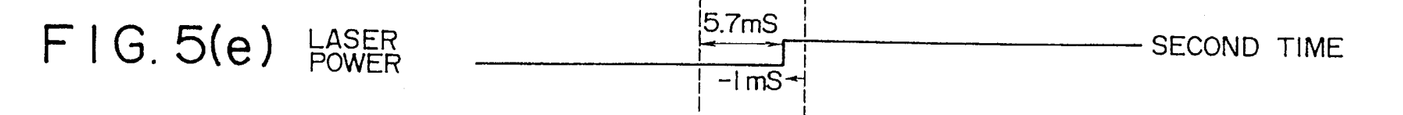
Figure 5F:
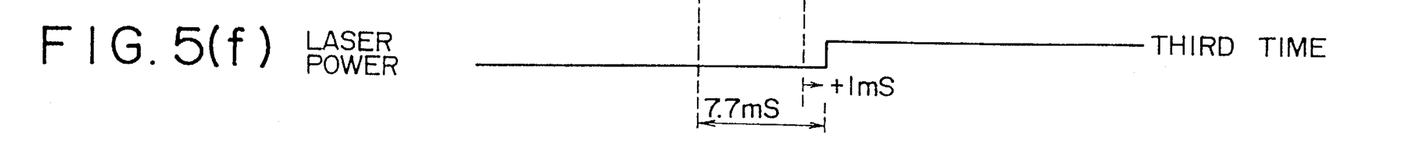

In general, the recording start point or position is variable within a range of ±1.36 msec about the elapsing position of the 6.7 msec period on the sector FD. Accordingly, the recovery action is carried out by changing the recording start position within the range specified above. For instance, when an error is caused due to the laser power control shown in FIG. 5(*d*), the same cluster is scanned again and, as shown in FIG. 5(*e*), the laser power is shifted up at a position on the sector FD which is after a period of 5.7 msec, running from the arrival of the optical head 3 or the light beam at the sector FD, elapses. If no defect is present at this position (5.7 msec position), then when the light beam reaches the defect Def after the time constant of the AGC control signal is returned to a somewhat large, ordinary value immediately after the shifting-up of the laser power, the recording operation will continue successfully without being affected by the defect Def.

If the defect Def has an extent which covers the 5.7 msec position of the sector FD, or when the light beam reaches the defect Def before the time constant of the AGC control signal is returned to the ordinary value, a recording error may occur again. In that case, the recording start position is changed again such that the laser power is shifted up at a position on the sector FD at which, as shown in FIG. 5(*e*), a 7.7 msec period running from the detection of the arrival of the light beam at the sector FD elapses. With this position shift, influences effected by the defect Def can be taken up, so that the recording operation continues successfully.

A control procedure achieved by the system controller 11 to carry out the foregoing error recovery action in the recording mode will be described below with reference to a flowchart shown in FIG. 4.

When the recording mode is selected, an error counter $E_{CNT}$ in the system controller 11 is set to "0" (step F101). Then, a recordable area is determined according to the user TOC information and the optical head 3 and the magnetic head 6 are set to a cluster position which is designated as a recording area. (step F102).

Subsequently, when the light beam arrives at the second sector FD of the recording cluster (step F103), a judgment is made to determine whether the error counter $E_{CNT}$ in the system controller 11 is set to "0" or not. If $E_{CNT}$=0, after the elapse of a 6.7 msec waiting or standby period (step F105), the time constant of the AGC control signal in the RF amplifier 7 is reduced (step F106), thereby increasing the output level or intensity of the light beam emitting from the optical head 3 to a high level (recording level) which is required for the recording operation (step F107). Immediately thereafter, the time constant of the AGC control signal in the RF amplifier 7 is returned to the ordinary value (step F108).

Thus, the laser power control shown in FIG. 5(*d*) is executed. In this instance, if the recording operation is performed properly without causing any error, then the arrival of the light beam at the second sector FD of the next cluster is detected while continuing the recording operation (steps F109 and F110). When arrival of the light beam at the sector FD of the next cluster is detected, a waiting or standby period of 6.7 msec is set (step F111). After the elapse of the waiting period, the output level or intensity of the light beam is lowered to a reproducing or playback level and the recording operation is suspended (step F112). In this instance, the error counter in the system controller 11 resets the count number $E_{CNT}$ to zero (step F113).

At this time, if all items of data to be recorded have already been recorded, the recording operation is terminated (step F114 and F116). In contrast, if an item of data still remains unrecorded, the address of a cluster to which a subsequent recording operation is performed is set (step F115). Then the control returns to the step F102 and the recording operation is effected on the thus set cluster.

If the sector FD has a defect and if a recording error occurs subsequent to the setting of the laser power to the recording level, the control advances from the step F110 to a step F117. This means that the system controller 11 recognizes the presence of the defect and starts taking a countermeasure to recover the recording error. At first, the laser power is lowered to the reproducing or playback level (step F117), and subsequently the error counter in the system counter 11 adds to the present count number $E_{CNT}$ an increment of 1 (step F118). Then, the control returns to the step F102 at which access to the recording start address is performed again until the light beam arrives at the sector FD (step F103).

Since the count number $E_{CNT}$ of the error counter is now set to 1, the control goes on from the step F119 to a step F120 at which the recording is started after the elapse of a 5.7 msec waiting or standby period. Subsequently, the time constant of the AGC control signal is controlled and the power level of the light beam is shifted up in the same manner as described above (steps F106, F107 and F108). By virtue of these control steps, the laser power is shifted in the manner shown in FIG. 5(e). In this instance, the recording operation starts from a recording start position which is displaced or shifted from that in the preceding recording operation in which the recording error took place. With the thus displaced recording start position, it is almost possible to cancel out the influence of the defect Def, thereby enabling the recording operation to be achieved successfully.

In the case where a recording error occurs again, the output level of the light beam is lowered to the reproducing or playback level (step F117) and the count number $E_{CNT}$ of the error counter is increased by one increment (step F118). Thereafter, the control returns to the step F102 at which access to the recording start position is executed again until the light beam arrives at the sector FD (step F103). In this instance, since the count number $E_{CNT}$ of the error counter is 2, then the control advances from a step F121 to a step F122 at which the recording is started after the elapse of a 7.7 msec waiting or standby period. With the waiting period thus provided, the recording operation is started from a recording start position which is displaced from that in the preceding reading operation.

The recording error may occur even after the recording start position is changed twice. In that instance, the count number $E_{CNT}$ of the error counter is 3. In the case of the illustrated embodiment, this means that the recording is not possible. Thus, the recording operation is stopped (step F123). However, the recording start position may be changed three times or more.

In the illustrated embodiment, the recording start position is shifted in 1 msec increments. The increment should be construed as illustrative and not restrictive. Furthermore, in the case where the recording and reproducing apparatus is used exclusively for a purpose of recording general data other than audio signals, the second encoder/decoder 14 and the memory 13 can be omitted. Additionally, in the embodiment described above, the principle of the present invention is embodied in a recording and reproducing apparatus. The invention can also be embodied in a recording apparatus which is used exclusively for recording purposes. Yet, the invention is applicable to a recording apparatus which is used with an erasable optical disc other than the magneto-optical disc.

Obviously, various minor changes and modifications of the present invention are possible in the light of the above teaching. It is therefore to be understood that within the scope of the appended claims the invention may be practiced otherwise than as specifically described.

What is claimed is:

1. A recording apparatus for an optical recording medium, the recording medium having a pregroove and address data identifying a plurality of sectors provided along the pregroove, said apparatus comprising:

recording means for recording data on the optical recording medium along the pregroove, said recording means having an optical head device for radiating a light beam having an intensity which is enough to record the data on the optical recording medium, said optical head device including a photodetector for detecting the quantity of light reflecting from the optical recording medium, and storing means for temporarily storing data, said optical head device being capable of receiving data supplied from said storing means; and a controller for controlling the operation of said recording means, said controller receiving an output signal from said photodetector for detecting the occurrence of a recording error within a recording start sector according to said output signal from said photodetector, said storing means being controlled to store the data when said recording error occurs and said optical head device being controlled to move a recording start point along the pregroove from the previous recording start point on the pregroove by a predetermined distance within the recording start sector and restart recording of the data supplied from said storing means from the thus moved recording start point on the optical recording medium.

2. A recording apparatus according to claim 1, wherein said controller comprises a detecting means for detecting the occurrence of said recording error corresponding to the output signal from said photodetector.

3. A recording apparatus according to claim 2, further comprising an error signal generator, an address decoder and a servo circuit, said error signal generator receiving said output signal from said photodetector and being operative to generate error signals and supply them to said servo circuit and said detecting means, said address decoder being operative to decode the address data from the output signal from said photodetector and supply the decoded address data to said detecting means, said servo circuit being operative to generate servo signals according to said error signals supplied from said error signal generator and supply said servo signals to said optical head device.

4. A recording apparatus according to claim 1, wherein said controller includes means for detecting the frequency of occurrence of successive recording errors during recording of a given data and sets said predetermined distance according to the frequency of occurrence of said recording errors.

5. A recording apparatus according to claim 1, wherein said controller controls the operation of said optical head device such that when said controller detects the occurrence of said error according to said output signal from said photodetector, an output level of said light beam emitted from said optical head device is lowered temporarily, and when the recording operation of said optical head device is restarted from said moved recording start point along the pregroove which is displaced from the previous recording start point on the pregroove by said predetermined distance, the output level of said light beam is increased to said intensity which is enough to record the data on the optical recording medium.

6. A recording apparatus for an optical recording medium, the optical recording medium having a pregroove and address data identifying a plurality of sectors provided along the pregroove, said apparatus comprising:

recording means for recording data on the optical recording medium along the pregroove, said recording means having an optical head device for radiating a light beam having an intensity which is enough to record the data on the optical recording medium, said optical head device including a photodetector for detecting the quantity of light reflecting from the optical recording medium, and storing means for temporarily storing data, said optical head device being capable of receiving data supplied from said storing means; and a controller for controlling the operation of said recording means, said controller receiving an output signal from said photodetector for detecting the occurrence of a recording error within a recording start sector according to said output signal from said photodetector, said storing means being controlled to store the data when the recording error occurs and said optical head device being controlled to start recording data supplied from said storing means from a predetermined position within the recording start sector which is a predetermined period away from the previous recording start address.

7. A recording apparatus according to claim 6, wherein said controller comprises a detecting means for detecting the occurrence of said recording error corresponding to the output signal from said photodetector.

8. A recording apparatus according to claim 7, further comprising an error signal generator, an address decoder and a servo circuit, said error signal generator receiving said output signal from said photodetector and being operative to generate error signals and supply them to said servo circuit and said detecting means, said address decoder being operative, to decode the address data from the output signal from said photodetector and supply the decoded address data to said detecting means, said servo circuit being operative to generate servo signals according to said error signals supplied from said error signal generator and supply said servo signals to said optical head device.

9. A recording apparatus according to claim 8, wherein said controller controls the operation of said optical head device such that when said controller detects the occurrence of said error according to said output signal from said photodetector, an output level of said light beam emitted from said optical head device is lowered temporarily, and when the recording operation of said optical head device is restarted from said predetermined position along the pregroove which is a predetermined period from the previous recording start address, the output level of said light beam is increased to said intensity which is enough to record the data on the optical recording medium.

10. A recording apparatus according to claim 6, wherein said controller sets said predetermined period according to the frequency of occurrence of said recording error.

11. A recording apparatus for an optical recording medium, the optical recording medium having a pregroove and address data identifying a plurality of sectors provided along the pregroove, said apparatus comprising:

recording means for recording data on the optical recording medium along the pregroove, said recording means having an optical head device for radiating a light beam having an intensity which is enough to record the data on the optical recording medium, said optical head device including a photodetector for detecting the quantity of light reflecting from the optical recording medium, and storing means for temporarily storing data, said optical head device being capable of receiving data supplied from said storing means and; and a controller for controlling the operation of said recording means, wherein said controller, upon receiving an output signal from said photodetector during recording of data at a first recording start point and detecting the occurrence of a recording error within a recording start sector, controls said storing means to store the data when the recording error occurs and said optical head device to move to a second recording start point along the pregroove by a first predetermined distance from the first recording start point and restart recording of data supplied from said storing means from the second recording start point within the recording start sector on the optical recording medium.

12. A recording apparatus according to claim 11, wherein the controller includes means for detecting the frequency of occurrence of successive recording errors during recording of a given data and sets the predetermined distance according to the frequency of occurrence of the recording errors.

13. A recording apparatus according to claim 11, wherein the data are organized into clusters of sectors for recording, and the controller shifts the position of the second recording start point within a single sector.

14. A recording apparatus according to claim 11, wherein the controller, upon detecting the occurrence of a recording error at the second recording start point, controls the optical head device to move to a third recording start point along the pregroove by a second predetermined distance from the first recording start point and restart recording of the data from the third recording start point on the optical recording medium.

15. A recording apparatus according to claim 14, wherein the controller, upon detecting the occurrence of a recording error at the third recording start point, terminates the recording operation and generates an error message.

16. A recording apparatus as in claim 15, wherein the second recording start point is before the first recording start point, and wherein the third recording start point is after the first recording start point.

* * * * *